(12) United States Patent
Zaidi et al.

(10) Patent No.: US 6,216,221 B1
(45) Date of Patent: Apr. 10, 2001

(54) METHOD AND APPARATUS FOR EXPANDING INSTRUCTIONS

(75) Inventors: Nazar A. Zaidi, San Jose; Michael J. Morrison, Santa Clara; Bharat Zaveri, San Jose, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/001,741

(22) Filed: Dec. 31, 1997

(51) Int. Cl.$^7$ .................................................. G06F 13/38
(52) U.S. Cl. ........................................... 712/226; 712/232
(58) Field of Search .................................... 370/412, 413, 370/335, 337, 428; 395/381, 800.23, 583, 390; 340/172.5; 710/54; 712/207, 226, 209, 232

(56) References Cited

U.S. PATENT DOCUMENTS

| | | | |
|---|---|---|---|
| 3,737,871 | * | 6/1973 | Katzman ........................... 340/172.5 |
| 5,611,063 | * | 3/1997 | Loper et al. ......................... 395/381 |
| 5,671,383 | * | 9/1997 | Valentine ............................. 395/392 |
| 5,778,245 | * | 7/1998 | Papworth et al. ............. 395/800.23 |
| 5,860,017 | * | 1/1999 | Sharangpani et al. .......... 395/800.23 |
| 5,872,948 | * | 2/1999 | Mallick et al. ....................... 395/377 |
| 5,961,615 | * | 10/1999 | Zaidi et al. ............................. 710/54 |

* cited by examiner

Primary Examiner—Chau Nguyen
Assistant Examiner—Alexander Boakye
(74) Attorney, Agent, or Firm—Blakely, Sokoloff, Taylor & Zafman LLP (57) ABSTRACT

A microprocessor includes a decoder, a queue, and a renamer. The decoder is adapted to receive a program instruction and decode the program instruction to provide a first decoded instruction. The first decoded instruction includes a plurality of instruction bits. The queue is coupled to the decoder and adapted to store the first decoded instruction. The renamer has a first input port and a first and second output port. The renamer is coupled to the queue and adapted to receive the first decoded instruction at the input port, provide the first decoded instruction on the first output port, change at least one of the instruction bits to generate a second decoded instruction, and provide the second decoded instruction on the second output port. A method for expanding program instructions in a microprocessor having a renamer is provided. The renamer includes a first input port and first and second output ports. The method includes receiving a first decoded instruction in the first input port. The first decoded instruction includes a plurality of instruction bits. At least one of the instruction bits of the first instruction is changed to generate a second instruction. The first decoded instruction is provided on the first output port, and the second decoded instruction is provided on the second output port.

29 Claims, 5 Drawing Sheets

METHOD AND APPARATUS FOR EXPANDING INSTRUCTIONS

BACKGROUND OF THE INVENTION

1. Field of the Invention

This invention relates generally to the processing of program instructions in a microprocessor, and more particularly, to expanding program instructions.

2. Description of the Related Art

Data structures, such as register files or queue structures store data for use in a digital system. Present microprocessors require multi-ported queue structures to allow more than one data entry to be written into the queue during a single clock cycle. Due to the data requirements, each port of the queue structure is wide (100+bits). As the number of ports increases the area occupied by the queue structure also increases. Due to the increased size a queue structure with a large number of ports may also encounter speed problems. Typically there is a trade off between the performance of the microprocessor (based on the number of ports) and the size of the queue structure.

Present microprocessors are capable of executing instructions out of order (OOO). Instructions are decoded in program order and stored into a queue structure. The instructions are read out of the queue structure by the OOO portion of the microprocessor. The OOO portion renames the instructions and executes them in an order based on the available resources of the microprocessor and the interdependency relationships between the various instructions. The queue structure represents the boundary between the in order portion of the microprocessor and the OOO portion.

One type of instruction executed out of order is a load instruction. Load instructions require that data be read from a storage device such as a register, cache memory, main memory, or external data storage device (e.g., hard drive). In order to hide the latency of load instructions (i.e., the time required to locate and load the requested data), it is desirable to execute the load instruction as soon as possible.

Figure 1A:
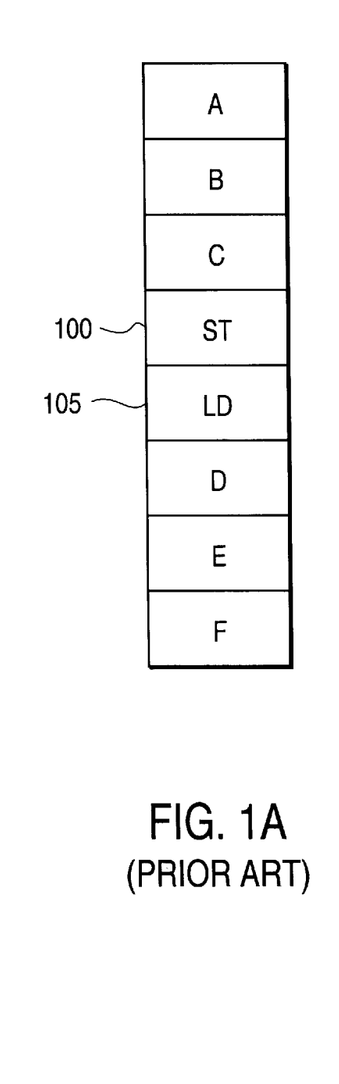
FIGS. 1A and 1B illustrate prior art sequence diagrams of a computer program.

Referring to FIG. 1A, a program sequence of a computer program as seen by the in order portion of the microprocessor is shown. The program sequence includes instructions A, B, and C, a store instruction 100, a load instruction 105, and instructions D, E, and F. If the load instruction 105 is not dependent on instructions A, B, or C, the OOO portion can schedule the load instruction 105 ahead of any or all of the other instructions. The early execution hides the latency of the load instruction, such that the microprocessor can complete the load before it actually needs the data (e.g., in instructions D, E, or F) and will not have to stall while the load is completing.

The early execution of the load instruction 105 is effective, as long as there is no conflict between the store address of the store instruction 100 and the load address of the load instruction 105. If there is a conflict, then the load instruction 105 has loaded incorrect data. To address such a conflict, the load instruction 105 is expanded into a speculative load instruction 110 and an architectural load instruction 115, as represented by the program sequence of FIG. 1B.

Figure 1B:
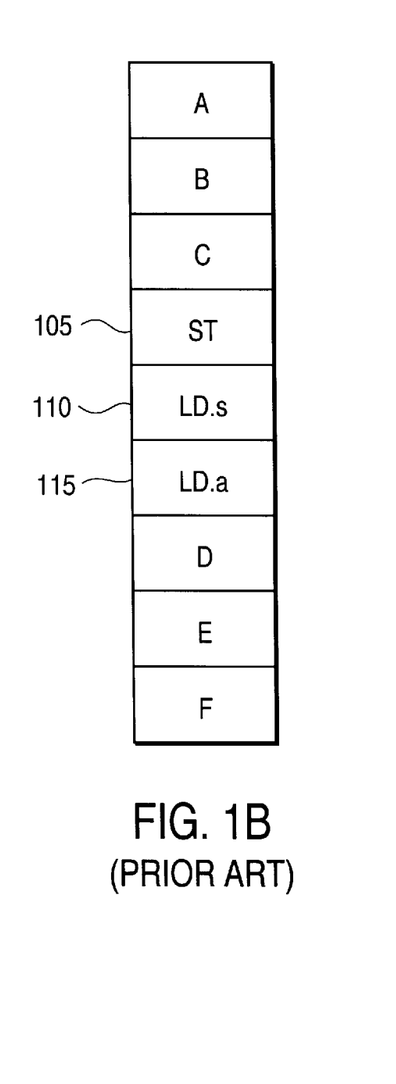

The speculative load instruction 110 is free of any dependency restrictions and can be scheduled by the OOO portion at any time. Conversely, the architectural load instruction 115 is always executed in program order. As a result, conflicts are identified when the architectural load instruction 115 is executed and the load can be reissued to retrieve the correct data, and the instructions following the load can be reissued.

When a load instruction 105 is decoded, both the speculative load instruction 110 and the architectural load instruction 115 are entered into the queue structure. Accordingly, two ports must be used for each load instruction. Assuming the queue structure has 5 ports, instructions A, B, C, the store instruction 100, and the load instruction 105, cannot be loaded during the same clock cycle due the expansion of the load instruction 105. To increase the performance of the queue structure an additional port would be required, thus increasing the area of the queue structure and introducing the potential for speed problems due to the increase in the number of wires and the length of the wires.

The present invention is directed to overcoming, or at least reducing the effects of, one or more of the problems set forth above.

SUMMARY OF THE INVENTION

An aspect of the invention is seen in a microprocessor including a decoder, a queue, and a renamer. The decoder is adapted to receive a program instruction and decode the program instruction to provide a first decoded instruction. The first decoded instruction includes a plurality of instruction bits. The queue is coupled to the decoder and adapted to store the first decoded instruction. The renamer has a first input port and a first and second output port. The renamer is coupled to the queue and adapted to receive the first decoded instruction at the input port, provide the first decoded instruction on the first output port, change at least one of the instruction bits to generate a second decoded instruction, and provide the second decoded instruction on the second output port.

Another aspect of the invention is seen in a method for expanding program instructions in a microprocessor having a renamer. The renamer includes a first input port and first and second output ports. The method includes receiving a first decoded instruction in the first input port. The first decoded instruction includes a plurality of instruction bits. At least one of the instruction bits of the first instruction is changed to generate a second instruction. The first decoded instruction is provided on the first output port, and the second decoded instruction is provided on the second output port.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
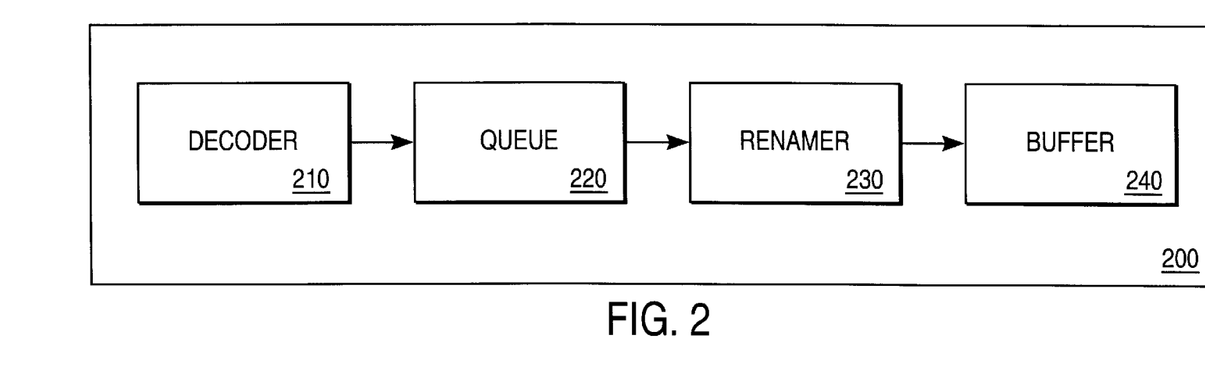
FIG. 2 illustrates a simplified block diagram of a microprocessor of the present invention.

Referring to FIG. 2, a simplified block diagram of a microprocessor 200 is shown. The microprocessor 200 includes many other functional units that are not shown or described. For clarity only the functional units necessary to illustrate the invention are shown. The microprocessor 200 includes a decoder 210, a queue 220, a renamer 230, and a buffer 240. The queue 220 represents the boundary between the in order out of order portions of the microprocessor 200. The decoder 210 decodes program instructions and loads the decoded program instructions into the queue 220. The renamer 230 reads decoded instructions out of the queue 220 and renames them such that they may be executed out of order. The renamer 230 writes the renamed instructions into the buffer 240.

In the illustrated embodiment, the queue 220 represents the instruction decoupling buffer of the microprocessor 200, and the buffer 240 represents the micro-op waiting buffer. In some implementations, the buffer 240 is also known as the reservation station.

Figure 3:
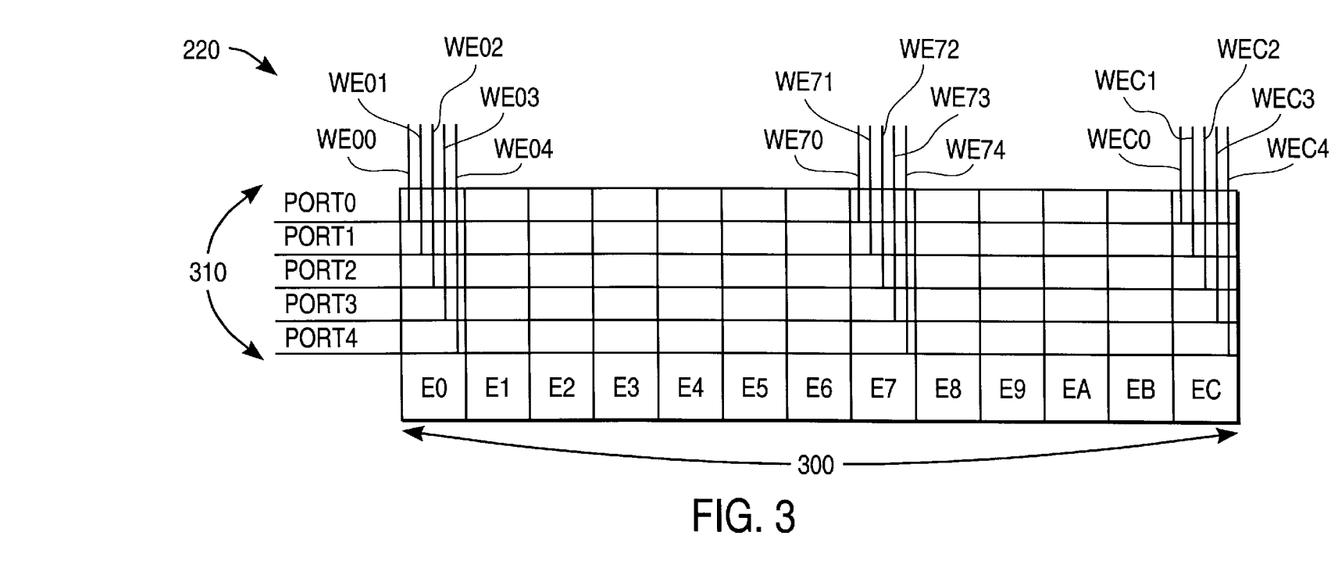
FIG. 3 illustrates a diagram of the structure of the queue in the microprocessor of FIG. 2.

FIG. 3 illustrates a diagram of the structure of the queue 220. The queue 220 includes entries 300. In the illustrated embodiment, the queue 220 is a circular first in/first out (FIFO) buffer having 13 entries. Individual entries 300 are referenced by E0 through EC. The specific number of entries 300 may vary depending on the specific design of the microprocessor 200. The queue 220 also includes 5 ports 310 for writing data into the entries 300. Each port 310 is connected to each entry 300. The ability of each port 310 to write into each entry 300 is controlled by write enables WExy, where x is the entry 300 number and y is the port 310 number. For example, if the value on port 4 is to be written into the twelfth entry (EB), the write enable WEB4 would be asserted (either high or low, depending on the specific design implementation). The queue 220 includes two read ports (not shown) for transferring data out of the queue 220 to the renamer 230.

In the illustrated embodiment, the decoder 210 acts as the control logic for enabling the queue 220. The queue structure 220 is indexed by a top of stack pointer (not shown) that indicates the next entry 300 to be read, and a bottom of stack pointer (not shown) that indicates the next entry to be written into. The top of stack pointer is incremented as the renamer 230 retrieves entries 300 from the queue 220, and the bottom of stack pointer is incremented as the decoder 210 loads data into the entries 300. If the bottom of stack pointer catches up to the top of stack pointer, the decoder 210 stalls until the renamer 230 reads more entries 300.

The queue 220 allows the contents of a single port 310 to be written into multiple entries 300 by asserting multiple write enables. For example, if the entries E3 and E4 are both tied to PORT2 by asserting the write enables WE32 and WE42, the value of the data on port 2 will be written into both entries E3, E4. The ability to write into more than one entry allows the queue 220 to function as if it had a larger number of physical ports 310.

Figure 4A:
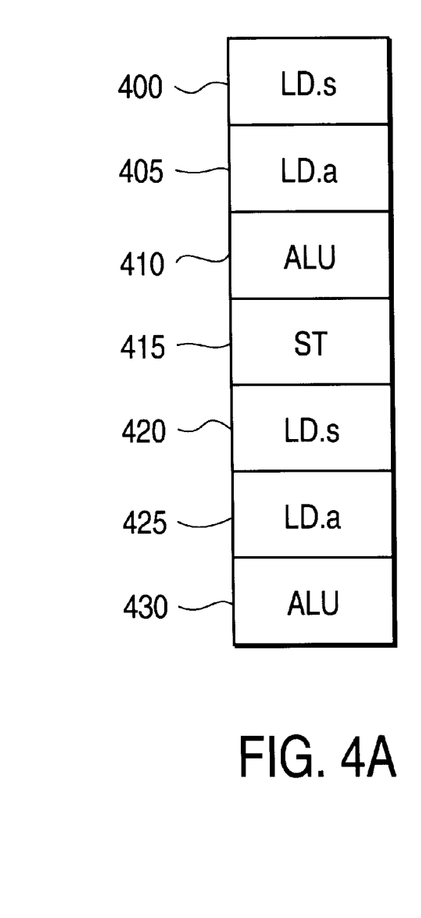
FIG. 4A illustrates a sequence diagram of a computer program used by the microprocessor of FIG. 2.

Referring to FIG. 4A, a program sequence is shown. The sequence includes a speculative and architectural load pair 400, 405, an arithmetic logic unit (ALU) operation 410, a store 415, a second speculative and architectural load pair 420, 425, and a second ALU operation 430. If the seven instructions in the program sequence were to be loaded into the queue 220 in a single clock cycle, seven ports 310 would be required. However, the bit pattern for the speculative load 400 is similar to the bit pattern for the architectural load 405. Accordingly, the same bit pattern can be written into multiple entries 300 using one port 310 and multiple write enables as described above.

Figure 4B:
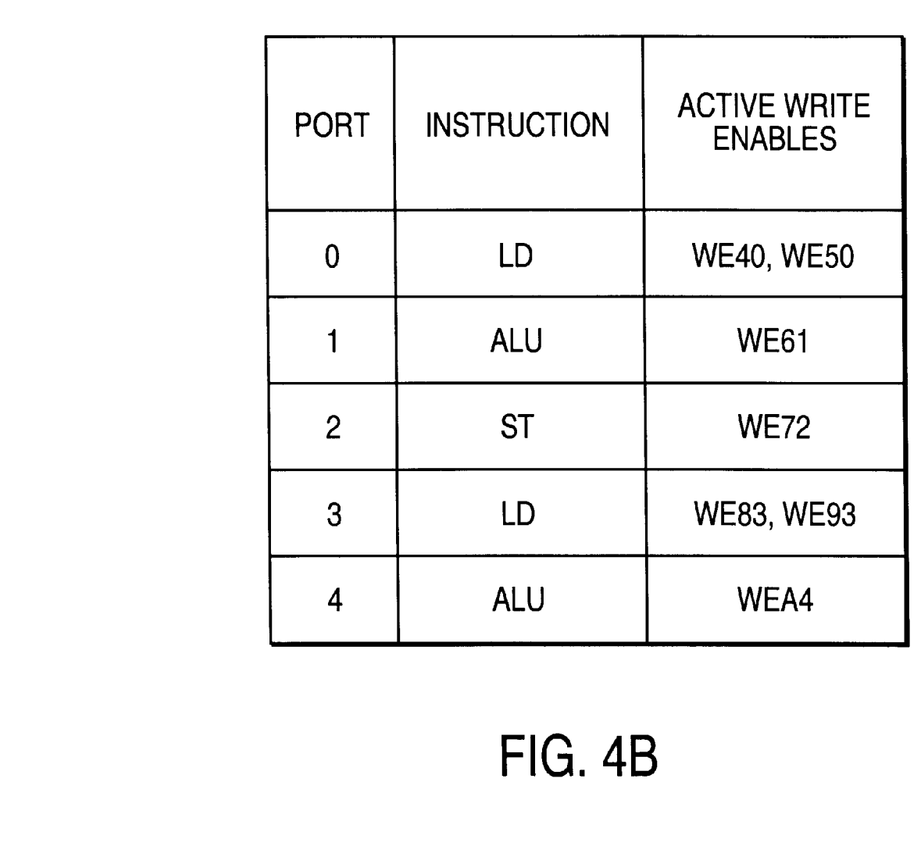
FIG. 4B illustrates a diagram of how the computer program of FIG. 4A is loaded into the queue structure of FIG. 2.

The write enable combinations used to load the instructions of FIG. 4A are shown in FIG. 4B. Assuming the bottom of stack pointer points to E4, the data present on the ports 310 are written as shown. The bit pattern for the load instruction is present on PORT0. The load instruction is written into entries E4 and E5 by asserting WE40 and WE50. The renamer 230 expects loads to be issued in pairs and thus interprets the first load instruction in E4 as the speculative load 400 and the second load instruction in E5 as the architectural load 405 when the instructions are read from the queue 220 and written into the buffer 240. The renamer 230 changes the necessary bits in the bit pattern to differentiate between the speculative and architectural loads.

The ALU instruction 410 on PORT1 is written into entry E6 by asserting WE61, and the store instruction 415 present on PORT2 is written into entry E7 by asserting WE72. The second load instruction is written into entries E8 and E9 by asserting WE83 and WE93. Again, the renamer 230 interprets the first load instruction in E8 as the speculative load 420 and the second load instruction in E9 as the architectural load 425 when the instructions are read from the queue 220 and written into the buffer 240. Finally, the second ALU instruction 430 on PORT4 is written into entry EA by asserting WEA4.

By asserting multiple write enables, as described above, the queue 220 functions as a seven port structure while actually having only 5 physical ports 310. The performance of the queue 220 and, as a result, the performance of the microprocessor 200 is improved without increasing the physical size of the queue 220.

Figure 5:
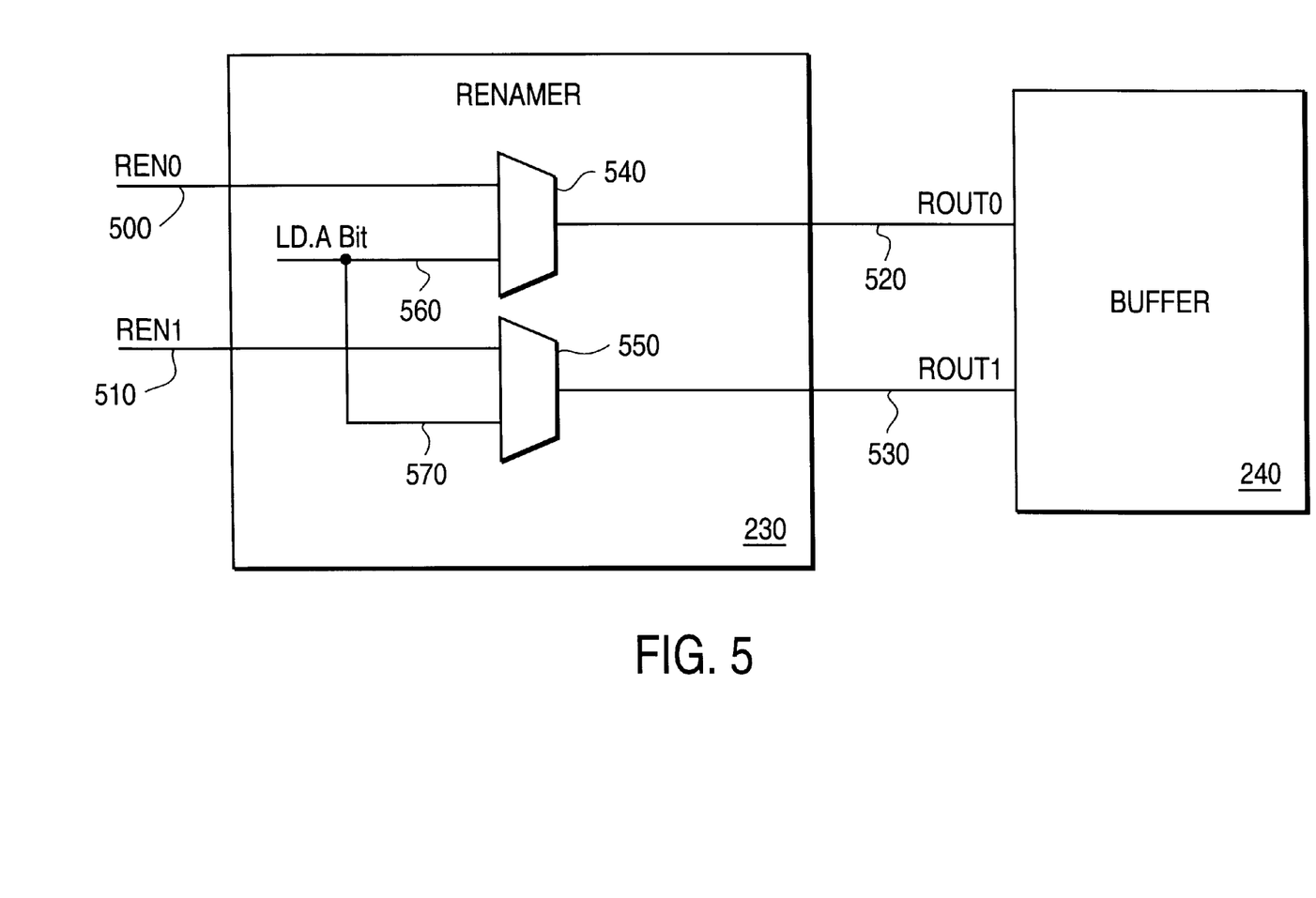
FIG. 5 illustrates a block diagram of the renamer and buffer of FIG. 1.

Referring to FIG. 5, a block diagram of the renamer 230 and the buffer 240 is shown. The renamer 230 has a REN0 input 500 and a REN1 input 510 corresponding to the two read ports of the queue 220 in the illustrated embodiment. The renamer 230 has a ROUT0 output 520 and a ROUT1 output 530 coupled to the buffer 240. As described above, the same bit pattern is written for both the speculative load and the architectural load, when a load instruction is written into the queue 220. Accordingly, the renamer 230 changes the bit pattern for one of the load instructions. In the illustrative example, the bit pattern for a speculative load is written into the queue 220. The renamer 230 expects the load instructions to be entered into the queue 220 in pairs, and therefore, the first load instruction is interpreted as the speculative load and the second load instruction is interpreted as the architectural load. Multiplexers 540, 550 are used to change the bit pattern of the second load instruction into that of an architectural load. It will be appreciated that if the bit pattern for an architectural load were written into the queue 220, the renamer 230 would change the bit pattern of the other load instruction into a speculative load. The particular load written into the queue 220 depends on design considerations.

Each renamer input 500, 510 includes a number of lines equal to the width (i.e., number of bits) of the input 500, 510. In the illustrative example of changing the bit pattern of the speculative load instruction into an architectural load instruction, many of the bits are identical. Assuming the load instruction to be altered is received on the REN0 input 500, the multiplexer 540 determines if the REN0 input 500 or if a LD.A bit 560 is passed to the ROUT0 output 520. The LD.A bit 560 is either high or low depending on the desired bit pattern of the architectural load instruction. The LD.A bit 560 functions as a bit change signal for modifying the instruction present on the REN0 input 560.

For those bits in the architectural load that are different than the speculative load, the multiplexer 540 passes the LD.A bit 560, thus changing the bit pattern. For those bits that are identical, the REN0 input 500 is passed to the ROUT0 output 520. Accordingly, no multiplexers 540 are required on the lines that have identical bit values. On those REN0 input 540 lines having multiplexers 540, the multiplexer 540 selects the LD.A bit 560 if an architectural load is being passed and the REN0 input 500 if a different instruction is being passed. The multiplexer 550 on the REN1 input 510 functions in a similar manner.

Figure 6:
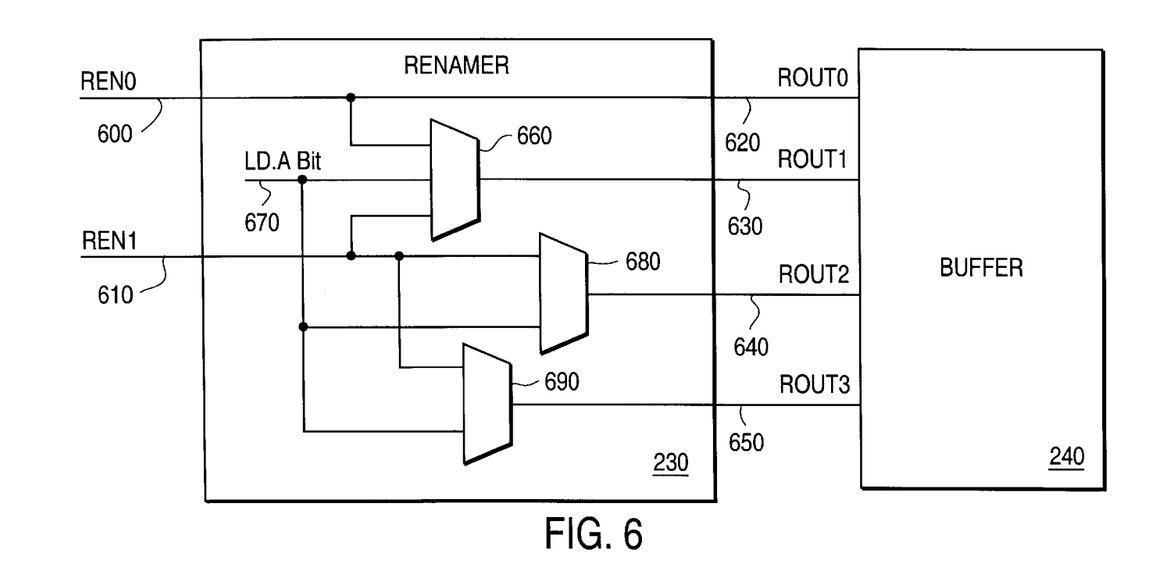
FIG. 6 illustrates a block diagram of an alternative embodiment of the renamer and buffer of FIG. 1.

A second embodiment of the invention is shown in FIG. 6. In the second embodiment, the load expansion is completed by the renamer 230 when the load is stored in the buffer 240. In the illustrated embodiment, the renamer 230 receives the data from the two read ports of the queue 220 on the renamer input REN0 600 and the renamer input REN1 610. When a load instruction is encountered by the decoder 210, it is written into the queue 220 without expanding the load into speculative and architectural loads. The renamer 230 expands the load instruction into speculative and architectural loads and writes the correct bit patterns into the buffer 240 based on the table shown in FIG. 6. The renamer 230 has four outputs, ROUT0 620, ROUT1 630, ROUT2 640, and ROUT3 650.

The renamer output ROUT1 620 is determined by a multiplexer 660 that receives both renamer inputs REN0 600 and REN1 610. The multiplexer 660 also has a third LD.A bit input 670 that serves a purpose similar to the LD.A bit 560 described in reference to FIG. 5. The multiplexer 660 is shown having three inputs, but in an actual implementation the multiplexer 660 only has two inputs. Assume the renamer input REN0 600 is 100-bits wide, and that a speculative load instruction is identical to an architectural load instruction except for ten bits. The 90-bits that are identical have a multiplexer 660 that receives the two renamer inputs REN0 600 and REN1 610. The ten bits having different values have a multiplexer 660 that receives the LD.A bit input 670 and the REN1 input 610. The multiplexer 660 is controlled such that for those bits that are identical the renamer input REN0 600 is provided to both renamer outputs ROUT0 620 and ROUT1 630. For those bits that are different, the renamer input REN0 600 is provided to the renamer output ROUT0 630 and the LD.A bit 670 is provided to the renamer output ROUT1 630. For ease of illustration the multiplexer 660 is shown having three inputs.

The renamer 230 also includes multiplexers 680, 690 for toggling between the renamer input REN1 610 and the LD.A bit 670 to generate an architectural load on the renamer outputs ROUT2 640 and ROUT3 650. As discussed above, the multiplexers 680, 690 are only required on those bits where the architectural load instruction differs from the speculative load instruction.

Figure 7:
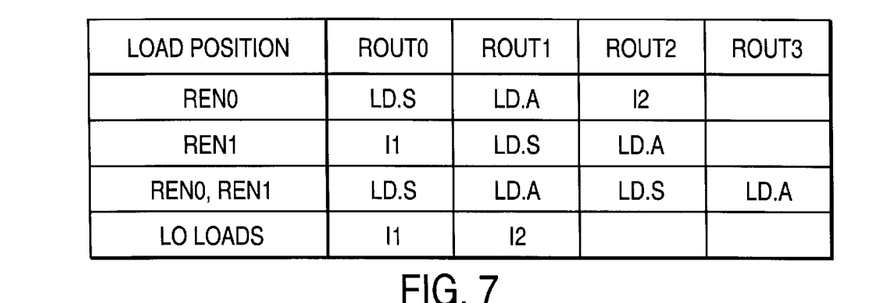
FIG. 7 illustrates a chart describing how the buffer of FIG. 6 is loaded by the renamer.

As seen in FIG. 7, if a load instruction is present on the renamer input REN0 600, the speculative load (LD.S) is written into the buffer 240 on the renamer output ROUT0 620, the architectural load (LD.A) is written into the buffer 240 on the renamer output ROUT1 630, and the instruction (I2) present on the renamer input REN1 610 is written into the buffer 240 on the renamer output ROUT2 640.

If a load instruction is not present on the renamer input REN0 600, but a load instruction is present on the renamer input REN1 610, the instruction (I1) present on the renamer input REN0 600 is written into the buffer 240 on the renamer output ROUT0 620, the speculative load (LD.S) is written into the buffer 240 on the renamer output ROUT1 630, and the architectural load (LD.A) is written into the buffer 240 on the renamer output ROUT2 640.

If a load instruction is present on both the renamer inputs REN0 600 and REN1 610, the respective speculative loads (LD.S) are written into the buffer 240 on the renamer outputs ROUT0 620 and ROUT2 640, and the respective architectural loads (LD.A) are written into the buffer 240 on the renamer outputs ROUT1 630 and ROUT3 650.

If no load instructions are present the instructions (I1 and I2) are written into the buffer 240 on renamer outputs ROUT0 620 and ROUT1 630, respectively.

The renamer 230 may also be defined such that all loads present on the renamer input REN1 610 be expanded into speculative and architectural loads on renamer outputs ROUT2 640 and ROUT3 650. In such an arrangement, the renamer output ROUT2 640 will never encounter an architectural load, and the multiplexer 680 could be omitted.

The application of the invention is not limited to the replication of load instructions. A load instruction is used as an exemplary instruction where significant data similarity exists. Depending on the specific design implementation and microprocessor architecture, other instructions may also have similar data patterns. The invention can be applied to any instructions having similar data patterns.

The illustrative embodiment of the queue 220 is described as it may be used in a microprocessor 200. In light of the specification, the structure of the queue 220 may be used in digital applications other than in a microprocessor 200.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A microprocessor comprising:
a decoder to receive a program instruction and decode the program instruction to provide a first decoded instruction, the first decoded instruction including a plurality of instruction bits;
a queue coupled to the decoder to store the first decoded instruction; and
a renamer having a first input port and a first and second output ports, the renamer being coupled to the queue to receive the first decoded instruction at the input port, provide the first decoded instruction on the first output port, change at least one of the instruction bits to generate a second decoded instruction, and provide the second decoded instruction on the second output port, one of the decoded instructions being a speculative instruction while the other decoded instruction being an architectural instruction.

2. The microprocessor of claim 1, wherein the first decoded instruction is a load instruction.

3. The microprocessor of claim 2, wherein the first decoded instruction is a speculative load instruction.

4. The microprocessor of claim 3, wherein the second decoded instruction is an architectural load instruction.

5. The microprocessor of claim 1, wherein the first input port includes a plurality of input lines to receive the instruction bits, and the renamer includes:
at least a first multiplexer having an output, a first input, and a second input, the first multiplexer being coupled to at least one of the input lines at the first input and a bit change signal at the second input.

6. The microprocessor of claim 5, wherein the renamer enables the first multiplexer to select the bit change signal and change the instruction bit of the decoded instruction to generate the second decoded instruction at the output of the first multiplexer.

7. The microprocessor of claim 1, wherein the first input port includes a first plurality of input lines, and the renamer includes:
a second input port having a second plurality of input lines; and
a first plurality of multiplexers, each having an output, a first input, and a second input, wherein the first input of each of the first plurality of multiplexers is coupled to one of the first plurality of input lines, the second input of each of the first plurality of multiplexers is coupled to one of the second plurality of input lines, and the output of each of the first plurality of multiplexers is connected to the second output port.

8. The microprocessor of claim 7, wherein the renamer further includes:
a plurality of bit change lines;
a second plurality of multiplexers, each having an output, a first input, and a second input, wherein the first input of each of the second plurality of multiplexers is coupled to one of the second plurality of input lines, the second input of each of the second plurality of multiplexers is coupled to one of the bit change lines, and the output of each of the first plurality of multiplexers is connected to the second output port.

9. The microprocessor of claim 8, wherein the second decoded instruction includes a second plurality of instruction bits, a first subset of bits is defined by the instruction bits of the first decoded instruction that are equal to the instruction bits of the second decoded instruction, a second subset of bits is defined by the instruction bits of the first decoded instruction that are different than the instruction bits of the second decoded instruction, the first plurality of multiplexers corresponds to the first subset, and the second plurality of multiplexers corresponds to the second subset.

10. The microprocessor of claim 7, wherein the renamer further includes:
a plurality of bit change lines;
a second plurality of multiplexers, each having an output, a first input, and a second input, wherein the first input of each of the second plurality of multiplexers is coupled to one of the second plurality of input lines, the second input of each of the second plurality of multiplexers is coupled to one of the bit change lines, and the output of each of the second plurality of multiplexers is connected to the second output port.

11. A method for expanding program instructions in a microprocessor having a renamer, the renamer including a first input port and first and second output ports, the method comprising:
receiving a first decoded instruction in the first input port; the first decoded instruction including a plurality of instruction bits;
changing at least one of the instruction bits of the first instruction to generate a second instruction;
providing the first decoded instruction on the first output port; and
providing the second decoded instruction on the second output port.

12. The method of claim 11, wherein the first instruction comprises a speculative load instruction, and changing at least one of the instruction bits includes changing at least one of the instruction bits of the speculative load instruction to generate an architectural load instruction.

13. A microprocessor, comprising:
a renamer including a first input port and first and second output ports;
means for receiving a first decoded instruction in the first input port; the first decoded instruction including a plurality of instruction bits;
means for changing at least one of the instruction bits of the first instruction to generate a second instruction;
means for providing the first decoded instruction on the first output port; and
means for providing the second decoded instruction on the second output port.

14. A microprocessor comprising:
a decoder to receive and decode program instructions to provide decoded instructions;
a queue coupled to the decoder to store said decoded instructions; and
a renamer including,
a first input port coupled to said queue,
a first and second output ports, wherein the first output port is coupled to said first input port to provide said decoded instructions received at said first input port, and,
a first circuit coupled to said second output port, to selectively change one of a plurality of instruction bits of said decoded instructions to generate modified decoded instructions and provide said modified decoded instructions on said second output port, the decoded instructions or modified decoded instructions being utilized as speculative instructions while the other instructions being utilized as architectural instructions.

15. The microprocessor of claim 14, wherein said renamer includes a second input port coupled to said queue and said first circuit.

16. The microprocessor of claim 14, wherein said first circuit is coupled to said first input port.

17. The microprocessor of claim 15, wherein the renamer includes:
   a third and fourth output ports; and
   a second and third circuit, both coupled to said second input port and each coupled to said third and fourth output ports respectively, each to selectively change one of a plurality of instruction bits of said decoded instructions to generate modified decoded instructions and to respectively provide said modified decoded instructions on said third and fourth output ports.

18. The microprocessor of claim 17, wherein said first circuit is coupled to said first input port.

19. The microprocessor of claim 17, wherein said queue stores a first and second copy of a decoded instruction generated responsive to a single one of said program instructions, said renamer passes said first copy unmodified through to one of the output ports and passes said second copy modified by one of said first, second, and third circuits.

20. A microprocessor comprising:
   a decoder to receive a program instruction and decode the program instruction to provide a first decoded instruction, the first decoded instruction including a plurality of instruction bits;
   a queue coupled to the decoder to store a first and second copy of said first decoded instruction; and
   a renamer including,
      a set of one or more input ports coupled to said queue to receive said first and second copies,
      a plurality of output ports, and
      a first selective bit change logic component, coupled to a first input port of said set and a first of said plurality of output ports, to alter one of said first and second copies.

21. The microprocessor of claim 20, wherein said renamer includes a second output port coupled to said first input port of said set.

22. The microprocessor of claim 20, wherein said renamer includes a second output port coupled to a second input port of said set.

23. The microprocessor of claim 20, wherein said renamer includes a second output port coupled to said first selective bit change logic component.

24. The microprocessor of claim 20, wherein said renamer includes a second output port coupled to a second selective bit change logic component, said second selective bit change logic component coupled to said first input of said set to alter one of said first and second copies.

25. The microprocessor of claim 20, wherein said renamer includes a second output port coupled to a second selective bit change logic component, said second selective bit change logic component coupled to said second input port of said set, to alter one of said first and second copies.

26. A microprocessor comprising:
   a decoder to receive program instructions and decode the program instructions to provide decoded instructions;
   a queue coupled to the decoder to store said decoded instructions; and
   a renamer including,
      a first and second input port, each with a plurality of input lines coupled to said queue to receive at least certain of said decoded instructions one at a time,
      a first and second output port, coupled to said first input port and said second input port respectively, and
      a first selection circuit coupled between at least one of said plurality of input lines of said first input port and said first output port and coupled to receive a different value than the one provided on said line.

27. The microprocessor of claim 26, wherein the renamer includes a second selection circuit coupled between at least one of said plurality of input lines of said second input port and said second output port and coupled to receive a different value than the one provided on said line.

28. The microprocessor of claim 27, wherein the renamer includes:
   a third and fourth output port; and
   a second and third selection circuit, each coupled between at least one of said plurality of input lines of said second input port and said third and fourth output ports respectively and coupled to receive a different value than the one provided on said line.

29. The microprocessor of claim 28, wherein the said second input port is coupled to said first selection circuit.

* * * * *

UNITED STATES PATENT AND TRADEMARK OFFICE
CERTIFICATE OF CORRECTION

PATENT NO.     : 6,216,221 B1
DATED          : April 10, 2001
INVENTOR(S)    : Zaidi et al.

It is certified that error appears in the above-identified patent and that said Letters Patent is hereby corrected as shown below:

Column 5,
Line 51, delete "620" and insert -- 630 --.

Column 6,
Line 2, delete "630" and insert -- 620 --.

Signed and Sealed this

Sixth Day of August, 2002

Attest:

Attesting Officer

JAMES E. ROGAN
Director of the United States Patent and Trademark Office